US008874075B2

(12) United States Patent
Dean

(10) Patent No.: US 8,874,075 B2
(45) Date of Patent: Oct. 28, 2014

(54) SYSTEM AND METHOD FOR UTILIZING A USER'S MOBILE PHONE ACCOUNT AS A FUNDING SOURCE

(71) Applicant: Willard S. Dean, Las Vegas, NV (US)

(72) Inventor: Willard S. Dean, Las Vegas, NV (US)

( * ) Notice: Subject to any disclaimer, the term of this patent is extended or adjusted under 35 U.S.C. 154(b) by 192 days.

(21) Appl. No.: 13/647,600

(22) Filed: Oct. 9, 2012

(65) Prior Publication Data
US 2014/0099915 A1    Apr. 10, 2014

(51) Int. Cl.
*H04M 11/00*    (2006.01)
*H04W 4/00*    (2009.01)

(52) U.S. Cl.
CPC ..................... *H04W 4/003* (2013.01)
USPC ........ 455/406; 455/414.1; 455/405; 455/410; 455/415; 455/422.1

(58) Field of Classification Search
CPC .... H04W 4/24; H04M 15/00; H04M 2215/32
USPC ............ 455/406, 414.1, 405, 410, 415, 422.1
See application file for complete search history.

(56) References Cited

U.S. PATENT DOCUMENTS

| | | | |
|---|---|---|---|
| 7,822,688 B2 | 10/2010 | Labrou et al. | |
| 7,826,822 B2 | 11/2010 | Pousti | |
| 7,979,350 B1 | 7/2011 | Carion | |
| 2008/0319915 A1* | 12/2008 | Russell et al. | 705/76 |
| 2010/0216425 A1 | 8/2010 | Smith | |
| 2012/0089521 A1 | 4/2012 | Abrevaya et al. | |
| 2012/0136783 A1 | 5/2012 | Pousti | |
| 2012/0209762 A1 | 8/2012 | Metaireau et al. | |
| 2012/0289188 A1* | 11/2012 | Marcus et al. | 455/406 |
| 2014/0087690 A1* | 3/2014 | Williams et al. | 455/406 |

FOREIGN PATENT DOCUMENTS

WO    2012020250 A1    2/2012

OTHER PUBLICATIONS

Dealbook, Investors Bet on Payments via Cellphone, www.nytimes.com, Jun. 2, 2009.
Darcy Travlos, All Eyes on Mobile Commerce, www.forbes.com, Nov. 10, 2009.
Kate Fitzgerald, Boku's Mobile Payment Platform Hands Banks' Role to Carriers, www.americanbanker.com, Feb. 23, 2012.
Bill-to-Carrier Rivalry Heats up with www.digitaltransactions.net, Mar. 23, 2010.
Peter Lucas, Carrier Billing's Dropped Call, Digital Transactions. net, Sep. 2010, pp. 12-18.

* cited by examiner

*Primary Examiner* — Nghi H Ly
(74) *Attorney, Agent, or Firm* — Ronald C. Gorsché

(57) ABSTRACT

The invention generally pertains to a method for providing a purchase incentive associated with the purchase of a product bundle to an end user using a mobile device connected to a transaction server over a mobile phone network. By way of example, a secure connection is created over the mobile phone network to exchange information between the transaction server and the mobile device. The end user selects the desired product bundle level—as a result receives a purchase incentive, i.e., cash rebate, remittance, refund and/or other monies—and delivery method using the mobile device. The mobile device connects to a third party payment processor over a secure connection, which charges the end user for the purchase of the product bundle. Specifically, the third party payment processor charges the purchase to the user's mobile phone account with a mobile carrier. Once the end user is notified of the successful purchase transaction, the desired value is delivered to the end user using the user selected delivery method.

14 Claims, 6 Drawing Sheets

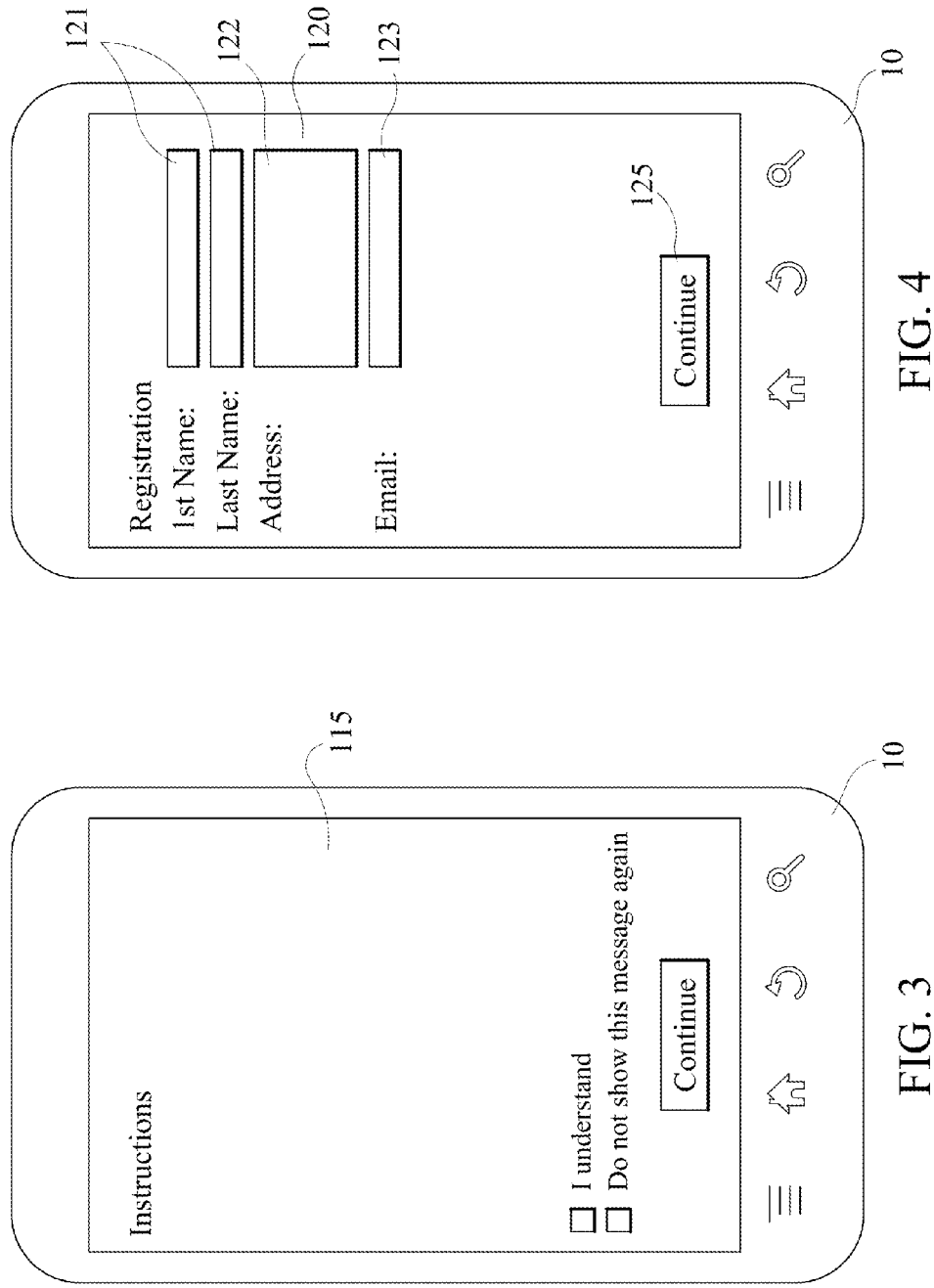

US 8,874,075 B2

SYSTEM AND METHOD FOR UTILIZING A USER'S MOBILE PHONE ACCOUNT AS A FUNDING SOURCE

FIELD OF THE INVENTION

Aspects of embodiments described herein apply to a unique implementation of smart phone application software, mobile payment processing platforms, and other technologies to facilitate the offering of instant and/or fast response cash rebates where the purchase that entitled the fast response cash rebate is funded solely through the consumer's mobile phone account, and the fast response cash rebate is not applied directly to the purchase that entitled said rebate, but is instead paid to the consumer through means of electronic funds transfer.

BACKGROUND OF THE INVENTION

Mobile phone software applications have become increasingly popular in our society through the use of web-based and mobile technologies. There are numerous software applications available on every smart phone platform for work and fun, from the financial to the recreational, including, more specifically, applications directed to both the financial industry and on-line shopping and purchases. Given the fact that more and more people are willing to conduct commerce over their mobile phone, the market for mobile phone financial transactions is taking off.

Currently, certain mobile phone software applications allow customers, who have either linked a bank account, debit card, credit card, credit line, prepaid debit card, gift card, or payment service such as PayPal, to make purchases within a mobile application or website. For example, applications exist that allow mobile users to transfer funds or make payments via their handset by entering in mobile telephone numbers. Taking mobile phone purchases a step further, certain providers/platforms have adopted a "Bill-To-Carrier" model whereby purchases made are billed to the users' mobile phone account and then billed to the user by the carrier. Significantly, under such a model, links to credit cards or bank accounts are not required.

So, against that backdrop, a need currently exists for a mobile phone application that utilizes a bill-to-carrier model for providing a mobile phone user with cash or a cash equivalent such as a refund, cash rebate, remittance, and/or other monies.

BRIEF SUMMARY

In one embodiment, a computer implemented method for providing cash to an end user using a mobile device connected to a transaction server over a mobile phone network is provided. First, a secure connection is created over a network to exchange information between the transaction server and the mobile device. Once the secure connection is created, the transaction server identifies the mobile number and the mobile carrier associated with the mobile device. The mobile device then executes the mobile funding software, which performs a series of interactive steps and effects communication with both the transaction server and a third party payment processor. The mobile device then receives and transmits identification and account information associated with the end user to the transaction server. In certain instances, the transaction server saves the information associated with the end user on a storage device coupled to the transaction server. The transaction server then verifies at least a portion of the information associated with the end user.

Continuing with the mobile funding software, using the mobile device, the user selects the desired value and delivery method. The mobile funding software then connects the mobile device to a third party payment processor to charge the end user for the desired value. If successful, the transaction server transmits a message to the mobile device to notify the end user that the transaction was approved and processed. Finally, the desired value is delivered to the end user using the user selected delivery method.

The foregoing and other features, utilities and advantages of the invention will be apparent from the following more particular description of various embodiments of the invention as illustrated in the accompanying drawings and claims.

BRIEF DESCRIPTION OF THE DRAWINGS

FIGS. 2-8 shows exemplary user interface display screen images showing the computer implemented method of the illustrated embodiment of the mobile funding software application present invention.

BRIEF DESCRIPTION

Figure 1:
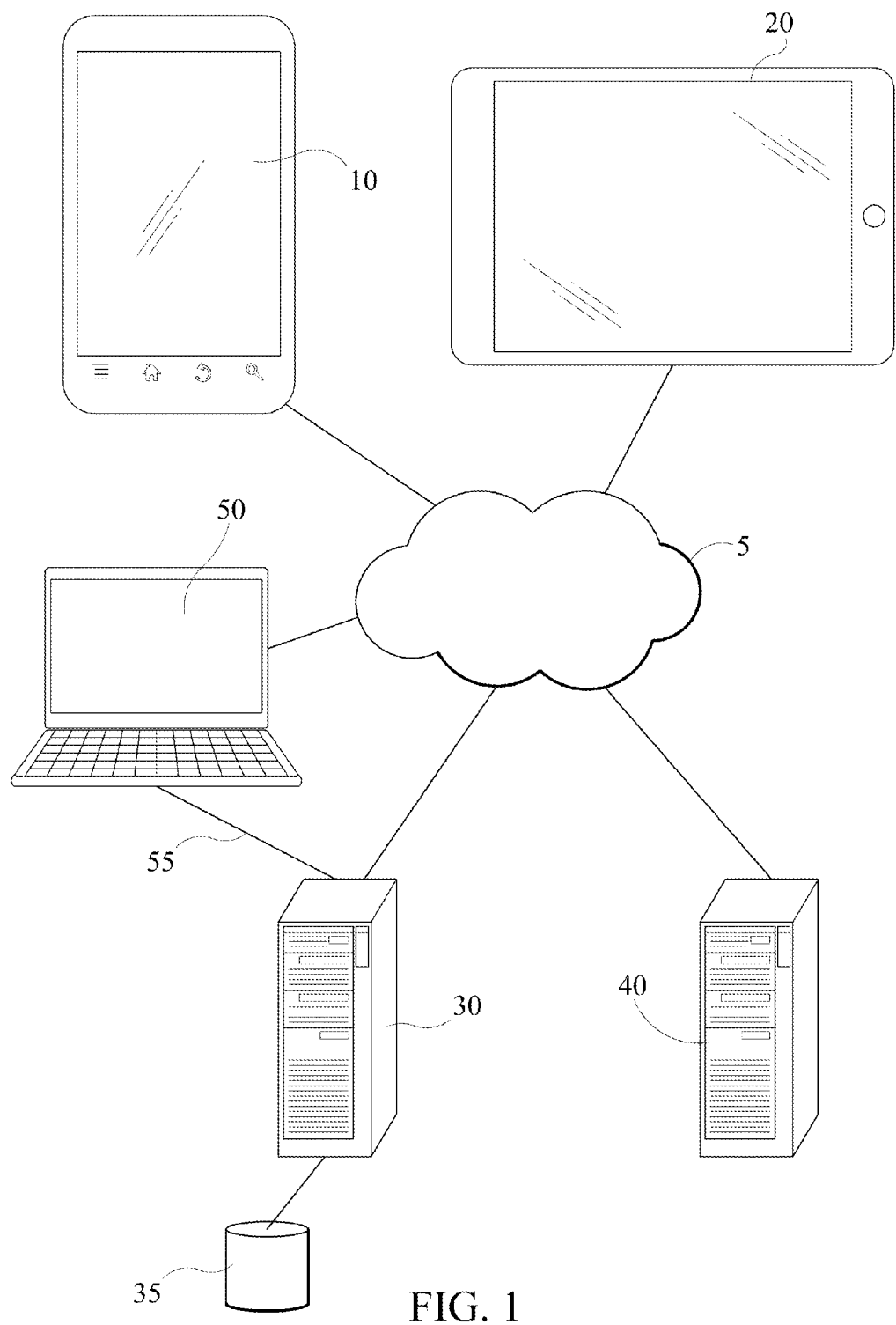
FIG. 1 illustrates a schematic view of a typical hosting/access environment for implementing the illustrated embodiment of the present invention.

In the following description, numerous specific details are set forth, such as examples of specific shapes, components etc., in order to provide a thorough understanding of the present invention. It will be apparent, however, to one skilled in the art that the present invention may be practiced without these specific details. In other instances, well known components or methods have not been described in detail, but rather in general terms in order to avoid unnecessarily obscuring the present invention. Thus, the specific details set forth are merely exemplary. The specific details may be varied from and still be contemplated to be within the spirit and scope of the present invention.

Reference to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others. In general terms, an algorithm is conceived to be a self-consistent sequence of steps leading to a desired result. The steps of an algorithm require physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. It is further contemplated within the scope of this invention that calculations can also be done mentally, manually or using processes other than electronic.

The present invention also relates to one or more apparatus for performing the operations herein. This apparatus may be specially constructed for the required purposes, or it may comprise a general-purpose computer selectively activated or reconfigured by a computer program stored within the computer. Such a computer program may be stored in a machine readable storage medium, such as, for example, any type of disk including floppy disks, optical disks, CD-ROMs, magnetic-optical disks, read-only memories (ROMs), random access memories (RAMs), EPROMs, EEPROMs, magnetic or optical card, or any type of media suitable for storing electronic instructions and coupled to a computer system bus.

The algorithms and displays presented and described herein are not inherently related to any particular computer or other apparatus or apparatuses. Various general-purpose systems may be used with programs in accordance with the teachings, or it may prove convenient to construct more specialized apparatus to perform the required method steps. The required structure for a variety of these systems will become readily apparent from the description alone. In addition, the present invention is not described with reference to any particular programming language, and accordingly, a variety of programming languages may be used to implement the teachings of the illustrated invention.

FIG. 1 is a schematic view of a typical hosting/access environment for implementing the present invention. In one embodiment, aspects of the present invention may be hosted on a secure transaction server 30 coupled to a storage device 35. Typically, storage device 35 is a database configured to store multiple records of users of the website described herein. In one embodiment, database 35 is a secure database capable of storing information in accordance with privacy laws of the United States and countries that allow access to the website of the present invention. In most cases, transaction server 30 is coupled to mobile phone network 5 so as to provide access to users of the site of the present invention. Users may access the website of the present invention in several different ways. In one embodiment, a user may use his or her his or her PDA device or cell phone 10 to access the information located on transaction server 30 and stored in storage device 35. In another embodiment, a user may choose to use a tablet device 10 to access the information on secure transaction server 30. In any event, any suitable device may be used to access transaction server 30, including a direct connection not connected to mobile phone network 5, so long as the device is capable of running a unique software application embodying one or more aspects of the illustrated invention and the associated connection is secure and configured to send and receive information from the secure transaction server.

In addition to a user of the software application described herein, a site administrator may access the transaction server 30 through a remote access over the mobile phone network 5 or a direct communication connection 55 using a personal computer 50 or other secure device to remotely update website content. Site administer may take all appropriate steps to facilitate the administration of the transactions of the software application that occur at the transaction server 30, including monitoring for security, troubleshooting, programming, updating, etc.

Continuing with the illustrated embodiment, user device 10 may also access a third party website resident on a remote server 40 through mobile phone network 5. In accordance with aspects of the illustrated embodiments, a third party website is provided to facilitate transactions on behalf of the software application of the present invention. For example, for purposes of the illustrated embodiment, a third party website may be the Google Play Store, which is configured to process a purchase on behalf of a software application and bill the purchase to a mobile carrier such as Verizon Wireless. One of ordinary skill in the art will appreciate that any third party website and/or mobile carrier may be used in accordance with the illustrated embodiment of the present invention without departing from the intended scope and spirit of underlying principles of operation. Accordingly, the process associated with payment processing will not be described in detail herein.

FIGS. 1A through 8 illustrate screen shots of exemplary user interface display screen image that may be provided or "served" by server 30 to one or more PDA devices 10 or tablets 20 through a software application resident on devices 10, 20 to facilitate the environment of the present invention. It should be understood that many other appropriate user interface display screens may be provided in addition to or instead of the illustrated screens, which are provided only as examples. Appropriate modifications may be made to the content of the user interface display screens for transactions involving items other than the content illustrated and described with respect to FIGS. 1A through 8.

Figure 1A:
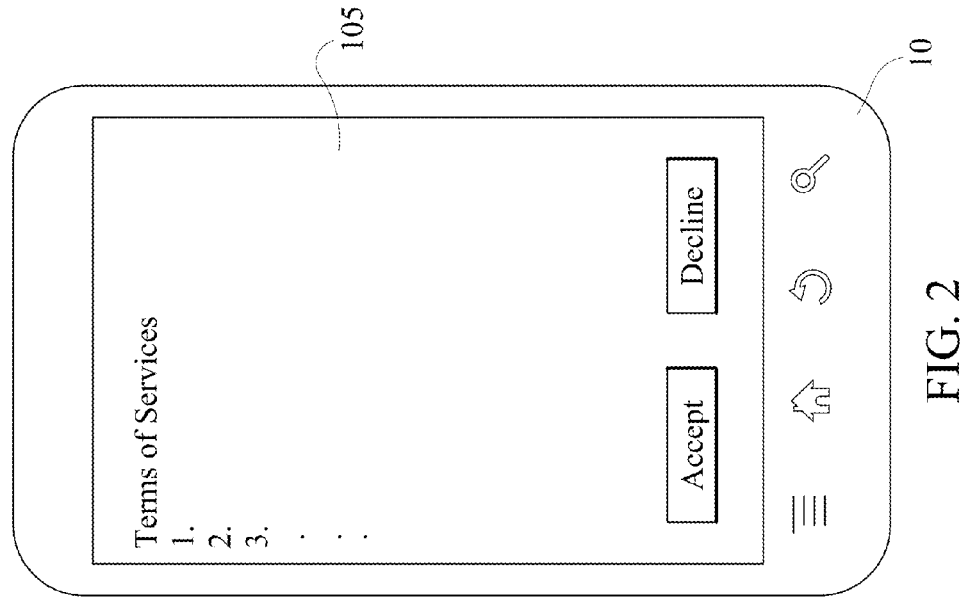
FIG. 1A illustrates a screen shot of a user interface display screen image on a mobile device that is returned when a user accesses the mobile funding software application associated with the illustrated embodiment of the present invention.

FIG. 1A illustrates an exemplary user interface display screen image 100 returned when a user accesses the transaction server (not shown) of the present invention using the software application resident on mobile device 10. Any reference to a specific name for the software application, such as mobile funding software, is for illustrative purposes only and shall be generic to the description, and so any name may substituted without departing from the scope and spirit of the illustrated invention. In the illustrated embodiment, the end user is either a returning user of the service or is a new member who needs to register prior to gaining access to the underlying content. One of ordinary skill in the art will appreciate that the user interface display screen image 100 may be different for a new user and a returning user. For example, the returning user may be given access to a secure portal to access the transaction server or access to a secure website that interacts with the transaction server and the user. The form is not important to the implementation of the present invention as long as the information is provided to the individual user in a manner that makes sense for purposes of maintaining the integrity and security of the data.

Figure 2:
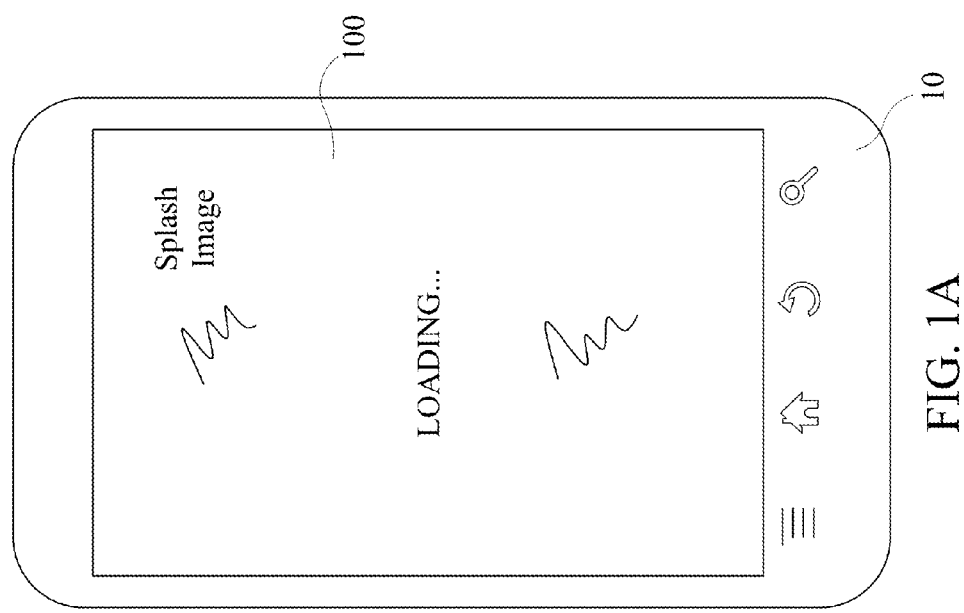

In the circumstances where the user is a new user of the software application, as shown on user interface display screen image 105 of FIG. 2, the user accepts or denies the terms of service and/or agrees or declines to be bound by an end user license agreement (EULA). In most cases, if the user does not agree to the terms of service and/or the terms of the EULA, he or she is unable to utilize the software application. Accordingly, he or she is transferred out of the environment. If the user agrees to the terms of the terms of service and/or EULA, as shown in FIG. 3, the user is provided with user interface display screen image 110 that details the instructions for using the illustrated embodiment in accordance with the software application. In the illustrated embodiment, the user must acknowledge in some way that he or she understands the instructions to continue. For example, user acknowledgement may be in the form of a "check the box" option that, if selected, reveals a choice that allows the user to continue with the next screen of the software application.

In the embodiment of the illustrated user interface display screen image 120 of the software application shown in FIG. 4, at some point of the method of the software application after acceptance of the terms and reading and accepting the instructions, the application returns a registration user interface display screen image 120 for the new user to sign up and enter pertinent information. In the illustrated embodiment, if the user is a returning user, the fields may automatically populate with information that was entered previously. If the user is new to the software application, user interface display screen image 120 provides several fields 121, 122, 123 for example, that permit a user to enter information that the site will save in storage device 35. In the illustrated embodiment, user interface display screen image 120 requests that a new user enter his or her first name, last name, email address, and possibly a password, user name, password hint, and security questions and answers to name a few. Some or all of this information may be required to uncover the submission button to gain access to the secure transaction server 30 that hosts the underlying background application modules associated with running the software application resident on the user's mobile device; however, any such mandatory information is at the discretion of the site operator and in no means limits the present invention. It should also be apparent to one of ordinary skill in the art that this requested information is by no means exhaustive and may include additional information or the sign-up process may include more elaborate steps with multiple layers of approvals and clearances, such as, for example, the issuance of a unique user identification and password. The illustrated example, and the pages associated with the software application, illustrate one particular method of implementing the present invention but is by no means the only way.

Once the new user enters the requested information in user interface display screen image 120, he or she would select the "CONTINUE" button 125. The action of the user submitting the user's information would initiate the process of granting access to the application of the present invention. In addition to entering information in menu fields, the software application may automatically identify the mobile number and mobile carrier associated with the device. In one embodiment, the information from user interface display screen image 120—both user entered and automatically identified—is transmitted to the transaction server 30 over a secure connection on the mobile phone network 5 to be stored in storage location 35. The transaction server 30 would then process the user information and determine if access to the transaction server 30 is to be granted. In the illustrated embodiment, the approval process is automated at the server level and requires no human interaction.

In the illustrated embodiment of FIG. 4, returning users may be identified by the mobile carrier and mobile number (or other unique identifier) associated with mobile device 10 or tablet 20. As stated above, the fields would automatically populate with information associated with the recognized mobile number or unique identifier. The user may update or change the information before continuing. Other checkboxes may be provided, so that the user does not have to re-enter information each time he or she returns to user interface display screen image 120. As an example, user interface display screen image 120 may also include a "Forgot my password" option (if one must be provided). If such option is selected, for example, the user answers a series of questions to either receive the information via a text message or via an email address associated with the account.

Figure 5:
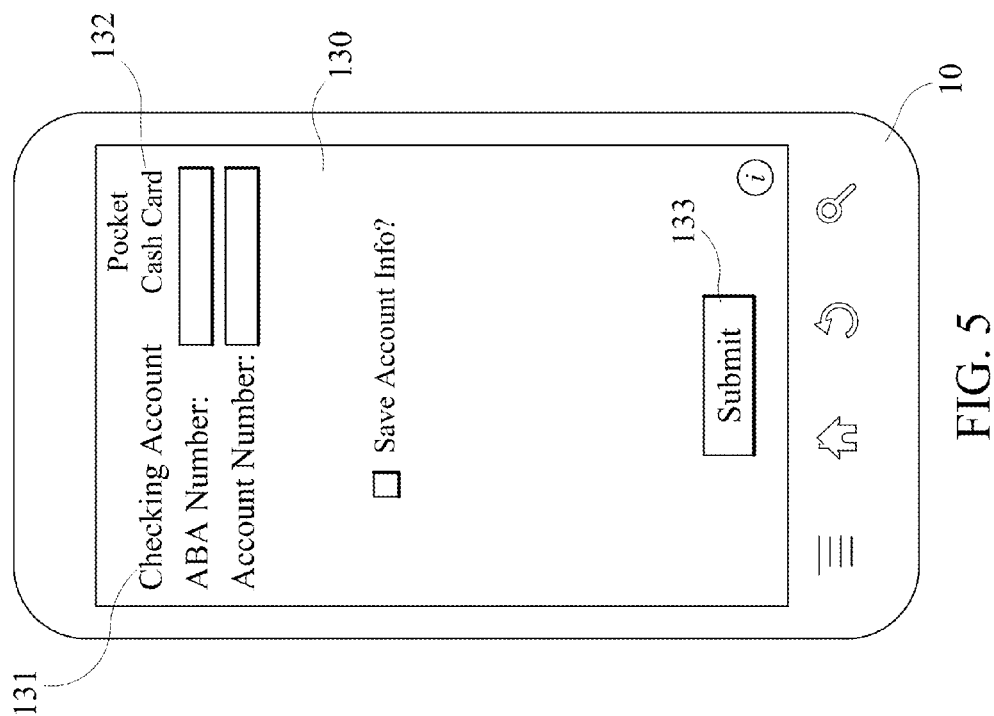
Figure 8:
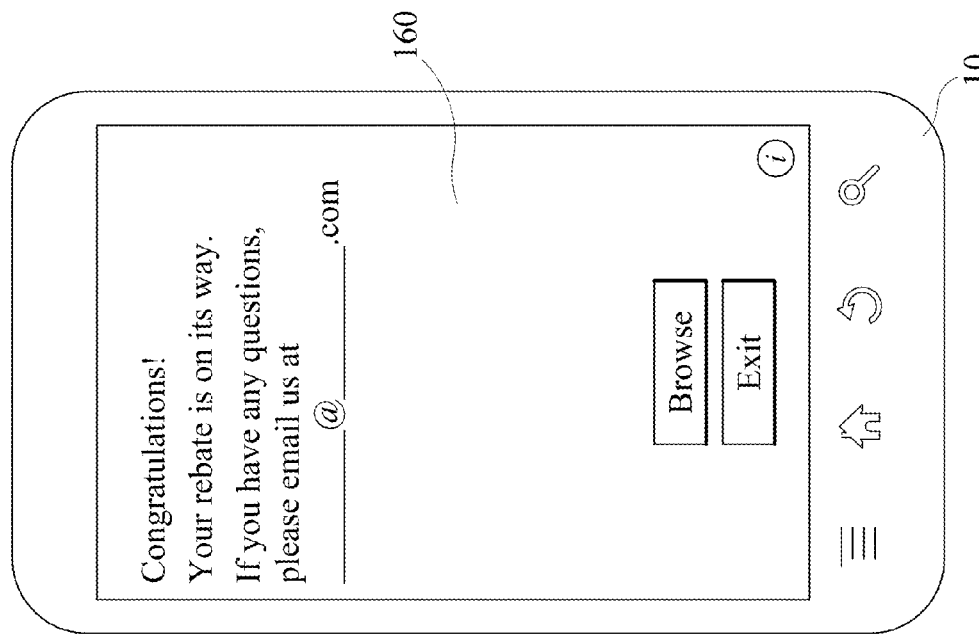
Figure 7:
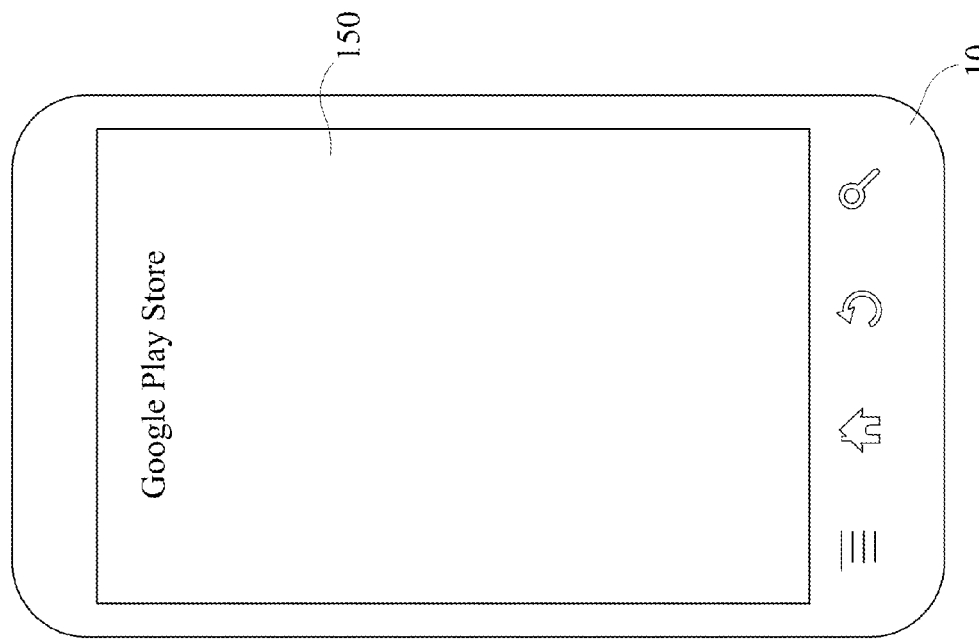

FIG. 5 illustrates an exemplary user interface display screen image 130 returned when the user enters the information required in user interface display screen image 120. At this point in the process, the user is queried as to how he or she will receive the refund, cash rebate, remittance, and/or other monies. In the illustrated embodiment, the user selects either the checking account option 131 or the pocket cash card option 132. One of ordinary skill in the art will understand and appreciate that any number of additional cash receiving methods may be used that fall within the intended scope of the illustrated embodiment. If the checking account option 131 is selected, user interface display screen image 130 returns a number of fields requesting the ABA routing number and checking/savings account number. Typically, both will be entered twice to reduce the opportunity for typographical errors in entering the information. The user is then provided with a checkbox option to save the information. The user selects the submit button 133. The information is then transferred to the secure transaction server 30 and stored on storage device 35, if necessary. Transaction server 35 may then connect with the appropriate location to verify the ABA routing number and/or checking account number. If the correct information is entered, the user is allowed to continue with the method associated with the software application.

Figure 6:
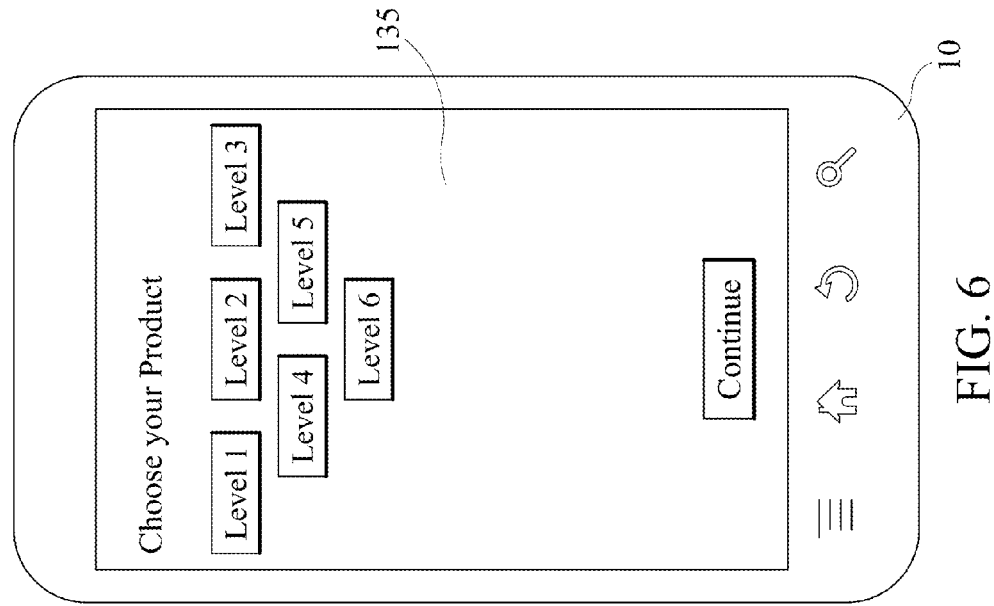

FIG. 6 illustrates user interface display screen image 135 associated with the illustrated embodiment of the software application. Once the user has entered the requisite information, he or she will select the desired product bundle which entitles a fast response cash rebate or refund as a purchase incentive. The amount of rebate received is commensurate with the product bundle level the customer has chosen. In the illustrated embodiment, the user selects the desired product bundle level which entitles a fast response cash rebate or refund as purchase incentive. Once the user selects the amount, the program returns certain processing information to guide the user through the payment processing. The user is then transferred to a third party to process the user's payment for the selected amount to complete the transaction. Significantly, the payment is processed by the third party payment processor and subsequently billed through the user's mobile carrier. In the illustrated embodiment of FIG. 7, the third party payment processor shown in user interface display screen image 150 of mobile device 10 is the Google Play Store; however, any number of third party payment processors may be used that offer similar transaction processing capabilities such as Apple App Store, Windows Store, and Blackberry App World to name a few non-limiting examples. If successful, the user is notified that the cash rebate, remittance, and/or other monies will be delivered in the manner selected by the user, such as illustrated in the user interface display screen image of FIG. 8. The user has the option to continue browsing the software application or exiting the application all together. At any point during the previous pages described here and above, the user may select an instructions icon that will provide a screen with additional details and guidance as to how to use the software application.

Figure 9:
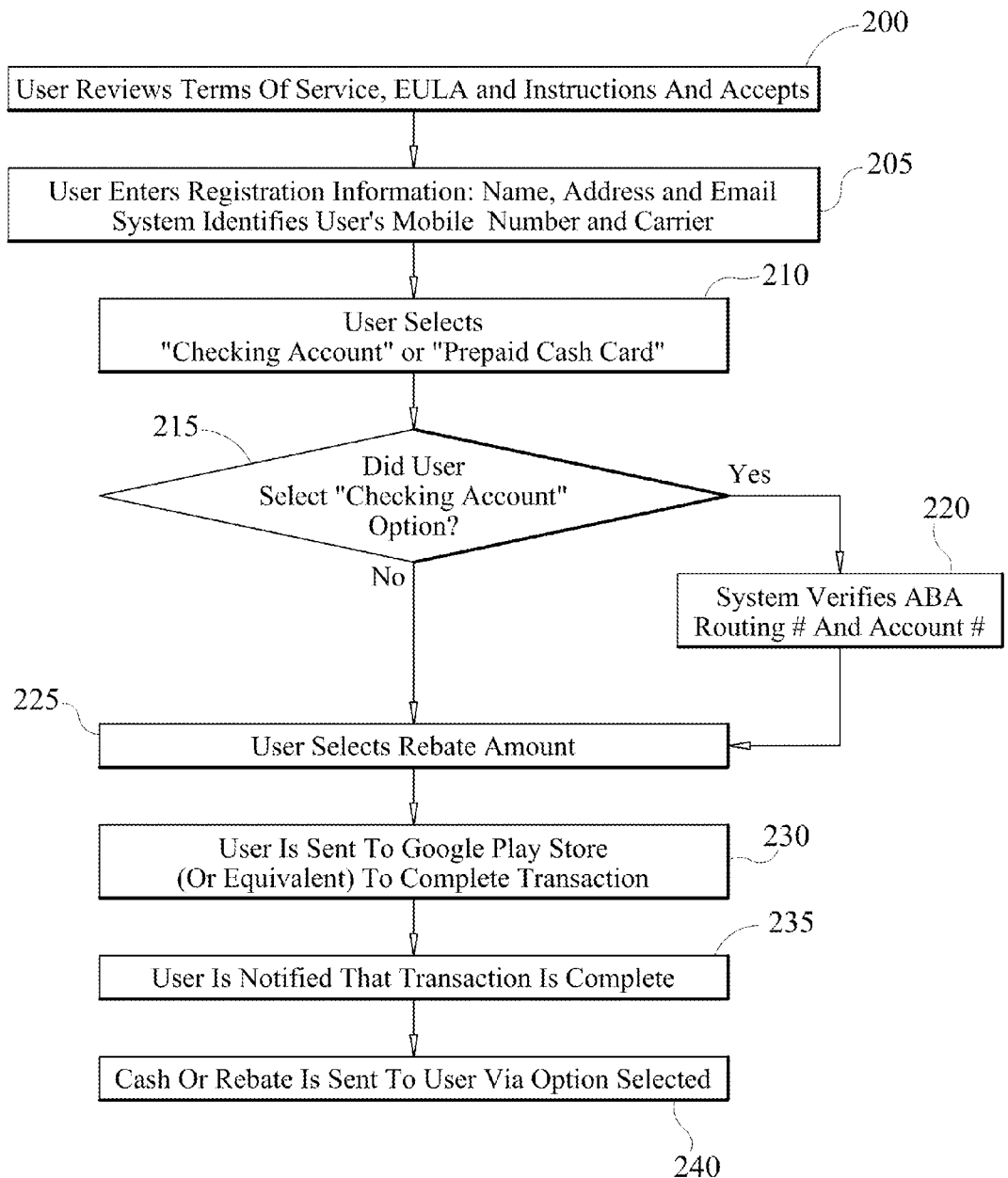
FIG. 9 shows the illustrated embodiment of the present invention in flow chart form.

Each potential module or sub-process associated with the illustrated embodiment of the mobile funding software described in connection with FIGS. 1A to 8 is briefly identified and/or described in the flow chart of FIG. 9. At operation 200, the end user reviews the terms of service, EULA and instructions and indicates, using their mobile device 10 or mobile device 20, that they accept the terms and understand the instructions. At operation 205, the end user enters registration information such as name, address, and email. In addition, the transaction server concurrently identifies the mobile number and mobile carrier associated with the connection. At operation 210, the user selects the manner of payment: checking account or prepaid cash card. In response to the end user's choice of checking account in operation 210, the transaction server queries a database to verify the ABA routing number entered by the user.

At operation 225, the user selects the rebate amount. At operation 230, the end user is transmitted to a third party payment processor, such as Google Play Store for example, to process the payment according to the amount selected in operation 225. At operation 235, if the transaction is successful, the end user is notified that the transaction is complete. Finally, at operation 240, the end user is sent the cash or rebate via the user selected delivery option.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A computer implemented method for providing a desired value associated with a product bundle to an end user using a mobile device connected to a transaction server over a mobile phone network, said method comprising: creating a secure connection over the mobile phone network to exchange information between the transaction server and the mobile device; identifying, at the transaction server, the mobile number, mobile phone account and the mobile carrier associated with the mobile device; executing, by the mobile device, a mobile funding software; transmitting, by the mobile device, information associated with the end user to the transaction server; saving the information associated with the end user to a storage device coupled to the transaction server; verifying, by the transaction server, at least a portion of the information associated with the end user; selecting, by the mobile device, the product bundle associated with the desired value and a delivery method for the desired value; connecting the mobile device to a third party payment processor to obtain payment for the product bundle, the payment being charged to the end user's mobile phone account; transmitting a message to the mobile device to notify the end user that purchase of the product bundle was approved and processed; and delivering the desired value to the end user using the user selected delivery method.

2. The computer implemented method of claim 1, wherein the desired value is chosen from a group consisting of cash rebate, remittance and refund.

3. The computer implemented method of claim 2, wherein the information associated with the end user is a name, an address, an email account, a bank routing number and a bank account number.

4. The computer implemented method of claim 3, wherein the at least a portion of the information associated with the end user is the bank routing number.

5. The computer implemented method of claim 4, wherein the delivery method for the desired value is direct deposit into the end user's bank account associated with the bank routing number and the bank account number.

6. The computer implemented method of claim 5, wherein the third party payment processor is chosen from a group consisting of Google Play Store, Apple App Store, Windows Store, and Blackberry App World.

7. The computer implemented method of claim 2, wherein the delivery method for the desired value is mailing a prepaid cash card to the end user.

8. A computer system comprising:
   a computer server and a machine readable medium storing executable instructions that when executed by the server cause the server to perform:
   identifying a mobile number and a mobile carrier associated with a mobile device,
   verifying the identity of an end user associated with the mobile device,
   receiving the information associated with the end user and storing the information on a storage device coupled to the server,
   verifying at least a portion of the information associated with the end user,
   receiving payment information from a third party payment processor, and
   if the payment information indicates a successful transaction, transmitting a message to the mobile device to notify the end user that the purchase of the product bundle was approved and processed; and
   a mobile device in communication with the server in a mobile network communication and comprising:
   a computer processor and a machine readable medium storing the mobile funding software comprising computer readable instructions that when executed by the computer processor cause the computer processor to perform:
   creating a secure connection over a network to exchange information between the transaction server and the mobile device,
   receiving information associated with the end user,
   transmitting the information associated with the end user to the transaction server,
   selecting a product bundle associated with the desired value and a delivery method for the desired value,
   connecting the mobile device to a third party payment processor to obtain payment for the product bundle, the payment being charged to the end user's mobile phone account, and
   receiving a message that notifies the end user that the purchase of the product bundle was approved and processed.

9. The computer system of claim 8, wherein the desired value is chosen from a group consisting of cash rebate, remittance and refund.

10. The computer system of claim 9, wherein the information associated with the end user is a name, an address, an email account, a bank routing number and a bank account number.

11. The computer system of claim 10, wherein the at least a portion of the information associated with the end user is the bank routing number.

12. The computer system of claim 11, wherein the delivery method for the desired value is direct deposit into the end user's bank account associated with the bank routing number and the bank account number.

13. The computer system of claim 12, wherein the third party payment processor is chosen from a group consisting of Google Play Store, Apple App Store, Windows Store, and Blackberry App World.

14. The computer system of claim 9, wherein the delivery method for the desired value is mailing a prepaid cash card to the end user.

\* \* \* \* \*